Patented Jan. 31, 1933

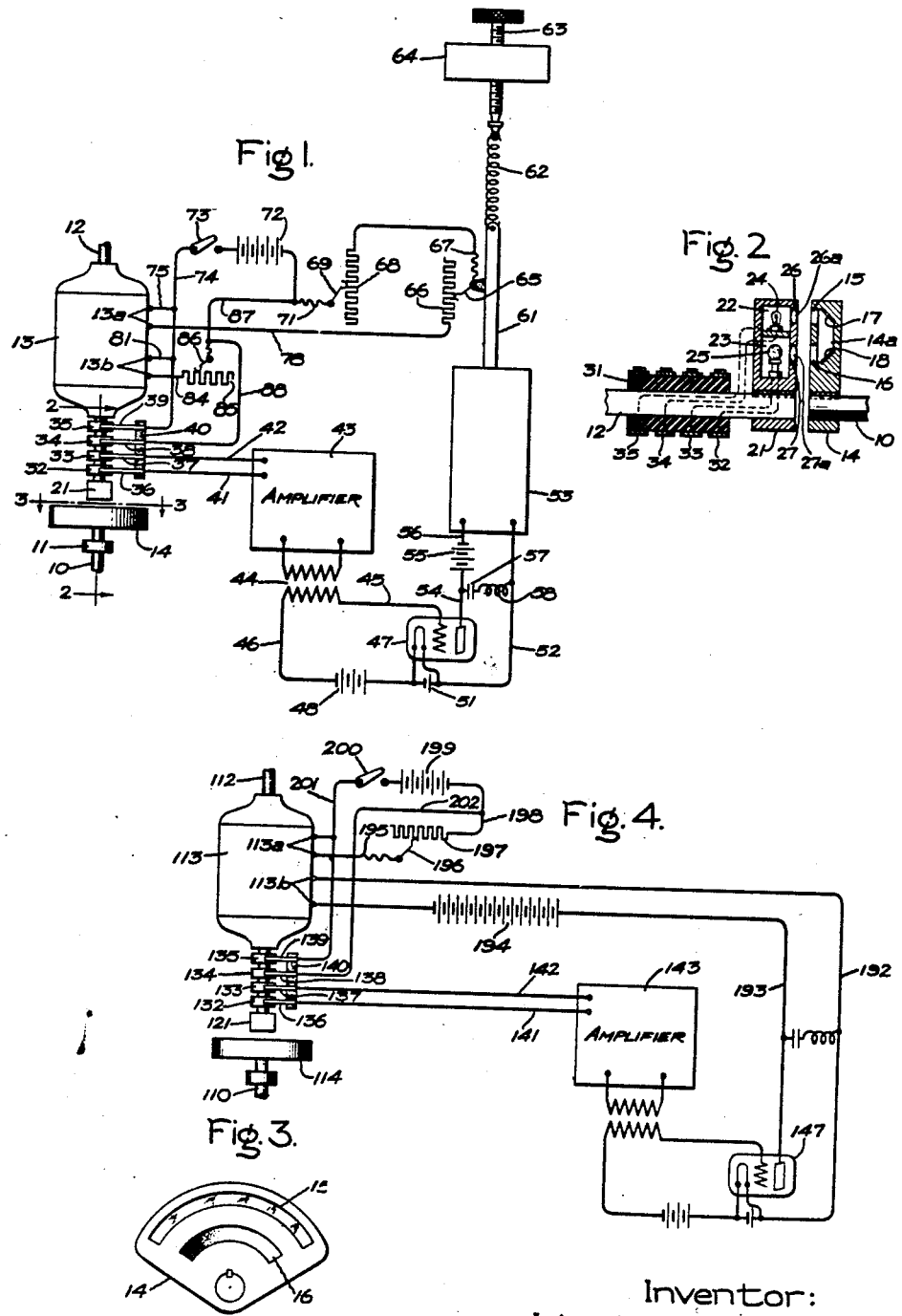

1,895,925

UNITED STATES PATENT OFFICE

JOHN HAYS HAMMOND, JR., OF GLOUCESTER, MASSACHUSETTS, ASSIGNOR TO GENERAL ELECTRIC COMPANY, A CORPORATION OF NEW YORK

ELECTRICAL CONTROL SYSTEM

Original application filed May 23, 1929, Serial No. 365,425. Divided and this application filed May 28, 1930. Serial No. 456,607.

My invention relates to electrical control systems, more particularly to electrical control systems for rotating members, and has for an object the provision of improved means for controlling the relative speed of said members.

Although my invention is not limited thereto, it has particular application in connection with synchronizing systems for a pair of rotating members which are located adjacent each other.

In accordance with my invention, I provide speed regulating means for one of the rotating members and control the speed regulating means so that a synchronous speed condition will be maintained between the members. I conveniently control the speed regulating means by means of a suitable light-sensitive device, which is activated responsively to the movements of the rotating members.

This application is a division of my co-pending application, Serial No. 365,425, filed May 23, 1929.

For a more complete understanding of my invention, reference should be had to the accompanying drawing in which Fig. 1 is a diagrammatic view of a synchronizing system embodying my invention; Fig. 2 is an elevation taken on the line 2—2 of Fig. 1; Fig. 3 is an elevation taken on the line 3—3 of Fig. 1; and Fig. 4 is a diagrammatic view of a modified form of my invention.

Referring to the drawing, I have shown my invention in one form in connection with a pair of rotatable shafts located adjacent each other. As shown, a shaft 10, mounted in a supporting bearing 11, is positioned adjacent a shaft 12. The rotatable shaft 10 will be actuated in any suitable manner, while the rotatable shaft 12 will be actuated by means of an electric motor 13 which is shown to be directly connected mechanically with the shaft. The motor 13 is provided with armature terminals 13a and with field terminals 13b.

In order to cause the shafts 10 and 12 to rotate in synchronism, I control the speed of the motor 13 responsively to the motion of the shafts. To this end, I provide suitable speed regulating means for the motor which will be controlled responsively to the motion of the shafts by means of a suitable light responsive means. As shown, this light responsive control means comprises a sector shaped housing or supporting member 14 rigidly mounted on the shaft 10. This member is provided with a compartment 14a having two substantially concentric curved openings 15 and 16. The opening 15 is provided with a transparent cover such as a plain sheet of glass, while the opening 16 is provided with a covering or screen of varying opacity. Thus, the opening 16 may be provided with a sheet of glass or other suitable material, that is transparent at one end, shown as the right-hand end as viewed in Fig. 3, and opaque at the other end, i. e., the left-hand end as viewed in Fig. 3. The portion between these two ends is graded so that the opacity varies in a substantially uniform manner from the transparent end to the opaque end. Mounted within the compartment 14a and back of the opening 15 is a curved mirror 17 positioned substantially at an angle of 45° to the opening, and mounted within the chamber 14a opposite to the opening 16 is a second curved mirror 18 positioned substantially at an angle of 90° to the mirror 17.

A second supporting member 21, which is provided with two compartments 22 and 23, is rigidly secured to the end of the shaft 12 adjacent the supporting member 14. A suitable source of illumination 24, shown as an incandescent lamp, is suitably mounted within the compartment 22, and suitable light sensitive means 25, shown as a photo-electric cell, is mounted within the compartment 23. These compartments are provided with apertures 26 and 27 (Fig. 2) directly opposite the openings 15 and 16, respectively, provided in the supporting member 14, and in these apertures are mounted suitable lenses 26a and 27a, respectively.

Mounted on the shaft 12 is a cylindrical insulating member 31, upon which is mounted three slip rings 32, 33 and 34, and a segmented commutator 35. Four brushes 36, 37, 38 and 39 are provided for engaging the three slip rings and the commutator, respectively. These brushes are mounted upon an insulated support 40. As shown, the photo-electric cell 25 is electrically connected to the two slip rings 32 and 33, while the source of illumination 24 is electrically connected to the slip ring 34 and to the commutator 35. The brushes 36 and 37 are electrically connected by two conductors 41 and 42 respectively, to an amplifier 43, which is tuned to the same frequency as produced by the commutator 35, which, for example, may by 500 cycles. It will be understood that the amplifier 43 will be of any suitable well-known construction. Thus for example, it may comprise suitable amplifying units of the thermionic character such as disclosed in my above mentioned copending application. It is believed unnecessary for a proper understanding of this invention to describe in detail the form and construction of this amplifier.

The output of the amplifier 43 is electrically connected to the primary winding of a transformer 44. One side of the secondary of this transformer is electrically connected by means of a conductor 45 to the grid of a tube 47, while the other side of this secondary is electrically connected by means of a conductor 46 to one side of a battery 48. As shown, the other side of the battery 48 is electrically connected to the filament of the tube 47 and to one side of a battery 51, the other side of which is electrically connected to the other side of the filament, and by means of a conductor 52 to one side of the winding of a solenoid 53. The plate of the tube 47 is connected by means of a conductor 54 to one side of a battery 55, the other side of this battery being connected by means of a conductor 56 to the other side of the solenoid winding. A capacity 57 and an inductance 58 are connected electrically between the conductors 52 and 54.

As shown, one end of the solenoid core 61, i. e., the upper end of the core, is mechanically connected to one end of a tension spring 62, the other end of which is mechanically connected, preferably by a swivel joint, to a thumb screw 63. This thumb screw is threaded into a suitable supporting bracket 64. It will be observed that the tension of the spring 62 may be adjusted conveniently to any desired amount by turning the thumb screw 63. Mounted on but insulated from the core 61, is a suitable brush 65 which is provided to control a suitable adjustable resistance 66. This brush is connected by a flexible conductor 67 to a second adjustable resistance 68, which is provided with an adjustable brush 69. This brush, as shown, is electrically connected by means of a flexible conductor 71 to one side of a battery 72. The other side of this battery is connected to the brush 39 through a switch 73 and a conductor 74. The conductor 74 is electrically connected by means of a conductor 75 to one of the armature terminals 13a, the other armature terminal being electrically connected to the adjustable resistance 66 by means of a conductor 78. The conductor 74 is also connected to one of the field terminals 13b by means of a conductor 81, the other field terminal being electrically connected by means of the conductor 84 to a suitable adjustable resistance 85. As shown, the resistance 85 is provided with an adjustable brush 86, this brush being electrically connected by means of the conductor 87 and the conductor 71 with the brush 69. The brush 86 is also connected by means of the conductor 88 with the slip ring brush 38. It will be observed that by reason of the above-described connections the battery 72 serves to electrically supply both the field and armature members provided for the motor 13, and also the incandescent lamp 24, which, as has been pointed out, is connected with the ring 34 and the commutator 35. It will also be observed that the field and armature members can be controlled by means of the adjustable resistances 68 and 85, and that the armature member is controlled automatically by means of the adjustable resistance 66.

In the operation of this form of my invention, the shaft 10 is rotated in any suitable manner at a predetermined speed and the motor 13 is operated to bring the shaft 12 up to this speed by adjusting the resistances 68 and 85 in the armature and field circuits, respectively. The switch 73, of course, will have been moved to its closed position so as to connect the battery 72 with the field and armature members.

It will be understood that a pulsating current will be sent through the lamp 24 by reason of the commutator 35 intermittently breaking the circuit from the brush 39. Pulsating light rays, therefore, will be passed through the lens 26a, through the transparent glass covering in the opening 15 and then will be deflected from the mirror 17 to the mirror 18, from whence the rays will be passed through the shaded glass in the opening 16 and thence through the lens 27a, which will focus the rays on the photo-electric cell 25. The current from the photo-electric cell will pass from the slip rings 32 and 33 through the brushes 36 and 37 from which it will be transmitted to the amplifier 43 by means of the conductors 41 and 42. It will be understood, therefore, that this current will be amplified, and that the amplified current will be transmitted to the power tube 47, which supplies current to the solenoid 53. It also will be understood that this current will be proportional to the intensity of the light transmitted to the photo-electric cell 25.

Under synchronous operating conditions, the supporting member 21 will be positioned opposite the center of the segmental supporting member 14 as shown in Fig. 1. Under these conditions, the tension of the spring 62 will be adjusted by means of the thumb screw 63 so that the brush 65 will be approximately on the center of the resistance 66. With the various parts of the system in their respective positions just described, and shown in Fig. 1, it will be understood that if the shaft 12 should lag behind the shaft 10, the supporting member 21 will be moved relative to the supporting member 14 so that the photo-electric cell 25 will be moved to a position opposite a less opaque part of the glass covering, provided for the opening 16, and as a result a greater amount of light will be transmitted to the photo-electric cell. Obviously, a greater amount of current will be caused to flow through the solenoid 53. This will cause the core 61 to be moved downwardly, as viewed in Fig. 1, against the tension of the spring 62 a distance proportional to the increase of illumination upon the photo-electric cell. As shown, this operation of the solenoid will effect a decrease in the effective resistance 66 connected in the motor armature circuit, and thereby will effect an increase in the motor armature current. The speed of the motor will be increased, therefore, until the supporting member 21 is brought back to its position opposite the center of the supporting member 14. When the supporting member 21 has thus been restored to its original position, the light transmitted to the photo-electric cell 25 will be reduced to its original intensity and as a result the current supplied to the solenoid 53 likewise will be reduced to its original value. It will be obvious, therefore, that the core 61 will move the brush 65 so as to be positioned over the center of the resistance 66.

If the shaft 12 should overrun the shaft 10, the supporting member 21 will take up a position such that the photo-electric cell 25 will be opposite a denser or more opaque portion of the glass in the opening 16. This movement of the shaft 12, therefore, will cause the light received by the photo-electric cell to be reduced and as a result the current supplied to the solenoid 53 will be reduced. It will be understood, therefore, that the spring 62 will pull the core 61 upwardly, as viewed in Fig. 1, so as to effect an increase in the resistance 66, which increase in resistance, of course, will effect a decrease in the motor speed so as to bring the shaft 12 back into synchronism with the shaft 10.

In the modified form of my invention shown in Fig. 4, I have dispensed with the solenoid 53 of Fig. 1. Otherwise, the structure of the modification is substantially the same as that of the form shown in Figs. 1, 2 and 3. Thus, in the modified form of the invention (Fig. 4), the shafts 110 and 112, the motor 113 and the light responsive means will be identical in construction with the corresponding parts of the modification shown in Figs. 1, 2 and 3. The housing 114 for the mirrors and the supporting member 121 for the photo-electric cell and its source of light are of the same construction as the corresponding parts 14 and 21 of Figs. 1, 2 and 3. So also, the slip rings 132, 133 and 134, and the commutator 135 are formed and mounted on the shaft 112, in substantially the same manner as are the rings 32, 33 and 34, and the commutator 35 formed and mounted on the shaft 12. The photo-electric cell mounted within the housing 121 is electrically connected to the slip rings 132 and 133, while the source of illumination, also mounted in the housing 121, is connected to the slip ring 134 and to the commutator 135.

The brushes 136 and 137, provided for the slip rings 132 and 133 respectively are connected by two conductors 141 and 142 to an amplifier 143 similar in construction to the amplifier 43 of Fig. 1. This amplifier is tuned to the same frequency as produced by the commutator 135, which, for example, may be 500 cycles.

The amplifier 143 is electrically connected with a power tube 147 as is the amplifier 43 of Fig. 1 connected with its tube 47. The output of the tube 147, however, is not connected to a solenoid, as is the amplifier 47, but is connected to control the motor field winding directly. As shown, the tube 147 is connected to the field terminals 113b by means of conductors 192 and 193. A battery 194, preferably of comparatively high voltage, is connected in the conductor 193 and thereby serves to electrically supply the motor field winding. It will be understood, of course, that the motor 113 will be provided with a field winding suitably wound to accommodate this high voltage. One of the armature terminals 113a, i. e., the lower terminal, as viewed in Fig. 4, is connected by means of a conductor 195 to an adjustable brush 196, which is provided for the adjustable resistance 197. This resistance is electrically connected by means of a conductor 198 to a battery 199, the other side of which may be connected with the upper armature terminal by means of a switch 200 and a conductor 201. It will be understood that the battery 199 serves to electrically supply the motor armature winding, the energization of which can be adjusted by means of the brush 196. It will be observed that the conductor 201 also serves to connect the switch side of the battery with the brush 139 provided for the commutator 135; and that the other side of the battery is connected through a conductor 202 with the brush 138 provided for the slip ring 134. This connection arrangement serves to electrically interconnect the battery 199 and the source of illumination mounted in the support 21, since this source, as has been pointed out, is electrically connected with the ring 134 and the commutator 135.

In this modified form of the invention it will be understood that the shaded glass in the opening of the supporting member 114 will be reversed so that the transparent portion is toward the left, as viewed in Fig. 3, while the opaque portion will be toward the right as viewed in this figure.

In the operation of this modified form of the invention, if the shaft 112 lags behind the shaft 110, less light will be received by the photo-electric cell, which as has already been described will cause a decrease of the current controlled by the plate of the tube 147. As a result of this action, it will be obvious that the current supplied to the motor field will be decreased. This, as is well understood, will cause the motor to speed up so as to again bring the two shafts into synchronism. If the shaft 112 should run faster than the shaft 110, more light will be received by the photo-electric cell whereby the current in the motor field circuit will be increased. This increase of the field current will cause the motor to slow down until the shafts are again brought into synchronism.

It will be obvious that with either modification, disclosed in Figs. 1, 2 and 3, or in Fig. 4, the rate of restoration of the shafts to synchronism will be proportional to the magnitude of the angular displacement between the shafts.

While I have shown several embodiments of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. The combination with a plurality of rotatable members of means for maintaining a predetermined speed ratio between said members comprising light sensitive means, means for moving said light sensitive means in accordance with the speed of one of said members, a source of light for activating said light sensitive means, means for moving said source of light in accordance with the speed of one of said members, means for varying the intensity of light transmitted from said source to said light sensitive means in accordance with a departure in the relative speed of said members from said predetermined speed ratio and means controlled responsively to the intensity of light transmitted to said light sensitive means controlling the speed of one of said members so as to restore said predetermined ratio at a rate substantially proportional to the magnitude of said departure.

2. The combination with a plurality of rotatable members of means for maintaining said rotatable members in synchronism comprising light responsive means, means controlled by said light responsive means for controlling the speed of one of said members, means for driving said light responsive means with one of said members, a source of light for actuating said light responsive means, a screen of varying opacity interposed between said light responsive means and its source of light and means for driving said screen with the other of said members so as to vary the light intensity transmitted to said light responsive means in response to a departure of said members from synchronism so that said members are restored to synchronism at a rate substantially proportional to the magnitude of the angular displacement between them.

3. The combination with a pair of rotatable members of means for maintaining said rotatable members in synchronism comprising light sensitive means connected to be moved in synchronism with one of said rotatable members, a source of light for activating said light sensitive means connected to be moved in synchronism with one of said rotatable members, means for varying the light intensity transmitted to said light sensitive means in response to a departure of said members from synchronism and speed controlling means for one of said members controlled by said light sensitive means.

4. The combination with a plurality of rotatable members of means for maintaining the members in synchronism comprising means for regulating the speed of one of said members, a photo-electric cell connected to control said speed regulating means, means for driving said photo-electric cell with one of said members, a source of light for activating said photo-electric cell, means for driving said source of light with said one member, a screen of substantially uniformly varying opacity interposed between said photo-electric cell and said source of light, means for driving said screen with the other of said members so as to control the intensity of light transmitted from said light source to said photo-electric cell whereby when said members depart from synchronism said speed regulating means is controlled to effect the restoration of said members to synchronism at a rate substantially proportional to the magnitude of said departure.

5. The combination with a plurality of rotatable members of means for maintaining said rotatable members in synchronism comprising light-sensitive means, a source of light for activating said light-sensitive means, a screen of substantially uniformly varying opacity interposed between said light-sensitive means and its source of light, means for moving said light sensitive means and said source of light in accordance with the rotation of one of said members and said screen in accordance with the rotation of the other of said members and means controlled by said light-sensitive means for controlling the speed of one of said members.

6. The combination with a pair of rotatable members of means for maintaining said rotatable members in synchronism comprising a photo-electric cell mounted upon the first of said members, a source of light for activating said photo-electric cell mounted upon said first member, means mounted upon the second of said members for directing the light rays from said light source to said photo-electric cell, means positioned in the path of said rays for varying the light intensity transmitted to said photo-electric cell in response to a departure of said members from synchronism and means controlled by said light-responsive means for controlling the speed of one of said members.

7. The combination with a plurality of rotatable members of means for maintaining said members in synchronism comprising speed regulating means for one of said members, light-sensitive means for controlling said speed regulating means, means for moving said light sensitive means in accordance with the rotation of one of said members, a source of light for activating said light-sensitive means, a screen of substantially uniformly varying opacity for controlling the intensity of light transmitted from said source of light to said light-sensitive means and means for moving said screen in accordance with the rotation of the other of said members so that the intensity of light transmitted to activate said light-sensitive means is varied in accordance with a departure of said members from synchronism.

8. The combination with a pair of rotatable members of means for maintaining said members in synchronism comprising speed regulating means for one of said members, light-sensitive means controlling said speed regulating means driven at a speed bearing a substantially constant ratio with the speed of one of said members, a source of light for activating said light-sensitive means driven at a speed bearing a substantially constant ratio with the speed of one of said members, a screen of substantially uniformly varying opacity arranged to control the intensity of light transmitted from said source of light to said light-sensitive means and means controlling said screen to vary the intensity of light transmitted to activate said light-sensitive means in accordance with a departure of said members from synchronism so that said members are restored to synchronism at a rate substantially proportional to the magnitude of said departure.

9. The combination with a pair of rotatable members of means for maintaining said rotatable members in synchronism comprising light-sensitive means driven at a speed bearing a substantially constant ratio with the speed of one of said members, a source of light for activating said light-sensitive means driven at a speed bearing a substantially constant ratio with the speed of said one member, a screen of varying opacity arranged in the path of the light rays from said source of light to said light-sensitive means and driven at a speed bearing a substantially constant ratio with the speed of the other of said members so as to control the light intensity transmitted to the light sensitive means in response to a departure of said members from synchronism and means controlled by said light-sensitive means for controlling the speed of one of said members.

10. The combination with a plurality of rotatable members of means for maintaining said members in synchronism comprising means for regulating the speed of one of said members, light sensitive means controlling said speed regulating means, a source of light for activating said light sensitive means, means for moving said light-sensitive means and said source of light in accordance with the rotation of one of said members, a screen arranged in the path of the rays of light from said source of light to said light-sensitive means, said screen varying substantially uniformly in opacity from one portion thereof to another portion thereof, an intermediate section corresponding to the position of angular agreement between said members and means for moving said screen in accordance with the rotation of the other of said members.

11. The combination with a pair of rotatable members of means for maintaining said rotatable members in synchronism comprising means for regulating the speed of one of said members, light-sensitive means mounted to rotate with said one member and arranged to control said speed regulating means, a source of light for activating said light-sensitive means also mounted to rotate with said one member, means mounted upon the other of said members for directing the light rays from said light source to said light-sensitive means and a screen of substantially uniformly varying opacity on said other member positioned in the path of said rays so as to vary the light intensity transmitted to said light-sensitive means in accordance with a departure of said members from synchronism.

12. The combination with a pair of rotatable members of means for maintaining said rotatable members in synchronism comprising a motor for operating one of said members, light-sensitive means connected to be moved at a speed bearing a substantially constant ratio with the speed of one of said members, a source of light for activating said light-sensitive means connected to be moved at a speed bearing a substantially constant ratio with the speed of one of said members, means for varying the light intensity transmitted to said light-sensitive means in response to a departure of said members for synchronism and means responsive to said light sensitive means for controlling the speed of said motor.

13. The combination with a pair of rotatable members of means for maintaining said rotatable members in synchronism comprising a motor arranged to operate one of said members, a controlling resistance for said motor, a light sensitive cell arranged to be rotated at a speed bearing a substantially constant ratio with the speed of rotation of said one member, a source of light for activating said light-sensitive cell arranged to be rotated at a speed bearing a substantially constant ratio with the speed of said one member, means for varying the light intensity transmitted to said light sensitive cell in response to a departure of said members from synchronism and means responsive to the activation of said light sensitive cell for controlling said speed controlling resistance.

In witness whereof, I have hereunto set my hand this 20th day of May, 1930.

JOHN HAYS HAMMOND, Jr.